(12) United States Patent
Ferslew et al.

(10) Patent No.: US 8,348,577 B2
(45) Date of Patent: Jan. 8, 2013

(54) FASTENER

(75) Inventors: Matthew Ryan Ferslew, Johnson City, TN (US); Indira Priyadarshini, Visakhapatnam, IN (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 13/016,184

(22) Filed: Jan. 28, 2011

(65) Prior Publication Data

US 2012/0195712 A1    Aug. 2, 2012

(51) Int. Cl.
F16B 37/00    (2006.01)

(52) U.S. Cl. .................................. 411/427; 411/436

(58) Field of Classification Search ............... 411/411, 411/427, 436
See application file for complete search history.

(56) References Cited

U.S. PATENT DOCUMENTS

| | | | |
|---|---|---|---|
| 232,432 A * | 9/1880 | Allison .................. 285/333 |
| 838,448 A * | 12/1906 | Pitcher .................. 403/43 |
| 991,517 A * | 5/1911 | Kennedy .................. 52/708 |
| 1,859,311 A * | 5/1932 | McEvoy, Jr. .................. 285/53 |
| 2,768,844 A * | 10/1956 | Schadeberg .................. 285/148.18 |
| 2,772,899 A * | 12/1956 | Evans .................. 285/333 |
| 2,880,761 A * | 4/1959 | Peter .................. 138/96 T |
| 3,129,963 A * | 4/1964 | Robbins .................. 285/334 |
| 3,473,782 A * | 10/1969 | Gessic .................. 251/149.6 |
| 4,266,813 A * | 5/1981 | Oliver .................. 285/12 |
| 4,712,812 A * | 12/1987 | Weir, III .................. 285/148.23 |
| 4,973,209 A | 11/1990 | Essom et al. |
| 5,580,101 A | 12/1996 | Fisher et al. |
| 5,689,871 A * | 11/1997 | Carstensen .................. 29/401.1 |
| 6,120,227 A | 9/2000 | Murase et al. |
| 7,334,975 B2 | 2/2008 | Jungman et al. |
| 7,341,414 B2 | 3/2008 | Raub et al. |
| 7,410,337 B2 | 8/2008 | Polubinski et al. |
| 7,985,041 B2 * | 7/2011 | Lin .................. 411/427 |
| 2010/0086378 A1 * | 4/2010 | Lin .................. 411/436 |

* cited by examiner

*Primary Examiner* — Roberta Delisle
(74) *Attorney, Agent, or Firm* — Dority & Manning, P.A.

(57) ABSTRACT

A fastener includes a threaded surface having an effective diameter. The effective diameter of the threaded surface changes along a first segment of the threaded surface. In addition, the effective diameter of the threaded surface changes along a second segment opposed to the first segment, and the change in the effective diameter of the threaded surface along the first segment is greater than the change in the effective diameter of the threaded surface along the second segment.

20 Claims, 7 Drawing Sheets

FASTENER

FIELD OF THE INVENTION

The present invention generally involves a fastener. In particular embodiments, the fastener may be, for example, a nut, a stud, a screw, or a bolt used to connect two or more objects together.

BACKGROUND OF THE INVENTION

Threaded fasteners are known in the art for connecting one or more objects together. For example, a threaded fastener such as a nut, a stud, a screw, or a bolt may be used to join a series of rotor wheels together in a gas turbine application. The threaded fasteners are often heat stretched or pre-loaded to increase the amount of force holding the components together. However, experience and testing have shown that a relatively small portion of the threads at the end of the threaded fastener receive a majority of the load holding the components together, with the remainder of the threads of the threaded fastener relatively unloaded. As a result, larger fasteners are needed to achieve a desired holding force, resulting in increased manufacturing, maintenance, and repair costs.

Various efforts have been made to increase the load bearing capabilities of threaded fasteners. For example, the pitch or distance between adjacent threads may be reduced to increase the number of load bearing threads at the end of the threaded fastener. Alternately, or in addition, the effective diameter of the load bearing end of the threaded fastener may be reduced to distribute the load to threads further from the end. Nonetheless, additional improvements in the design of threaded fasteners would be desirable to improve the load distribution among the threads.

BRIEF DESCRIPTION OF THE INVENTION

Aspects and advantages of the invention are set forth below in the following description, or may be obvious from the description, or may be learned through practice of the invention.

One embodiment of the present invention is a fastener that includes a threaded surface having an effective diameter, a first end of the threaded surface, and a second end of the threaded surface opposite the first end. An intermediate position of the threaded surface is between the first end and the second end. The effective diameter of the threaded surface changes from the intermediate position to the first end and from the intermediate position to the second end. The effective diameter of the threaded surface at the first end is different than the effective diameter of the threaded surface at the second end.

Another embodiment of the present invention is a fastener that includes a threaded surface having an effective diameter. The effective diameter of the threaded surface changes along a first segment of the threaded surface. In addition, the effective diameter of the threaded surface changes along a second segment opposed to the first segment, and the change in the effective diameter of the threaded surface along the first segment is greater than the change in the effective diameter of the threaded surface along the second segment.

A still further embodiment of the present invention is a fastener that includes a threaded surface having a first end, a second end opposite the first end, and an effective diameter between the first end and the second end. An intermediate position is on the threaded surface between the first and second ends. The effective diameter of the threaded surface changes from the intermediate position to the first end and from the intermediate position to the second end, and the effective diameter of the threaded surface at the first end is greater than the effective diameter of the threaded surface at the second end.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a fastener with an asymmetrically threaded surface to enhance the load distribution among the threads and/or reduce the shear stress across the threads. In various embodiments, the effective diameter of the threaded surface changes axially outward from an intermediate position or segment so that the ends of the threaded surface have different effective diameters from each other, thus producing an asymmetrically threaded fastener. In particular embodiments, the fastener may be a nut with a threaded internal surface, in which case the effective diameter increases axially outward from the intermediate position or segment. In other particular embodiments, the fastener may be a stud, screw, or bolt with a threaded external surface, in which case the effective diameter decreases axially outward from the intermediate position or segment.

Figure 1:
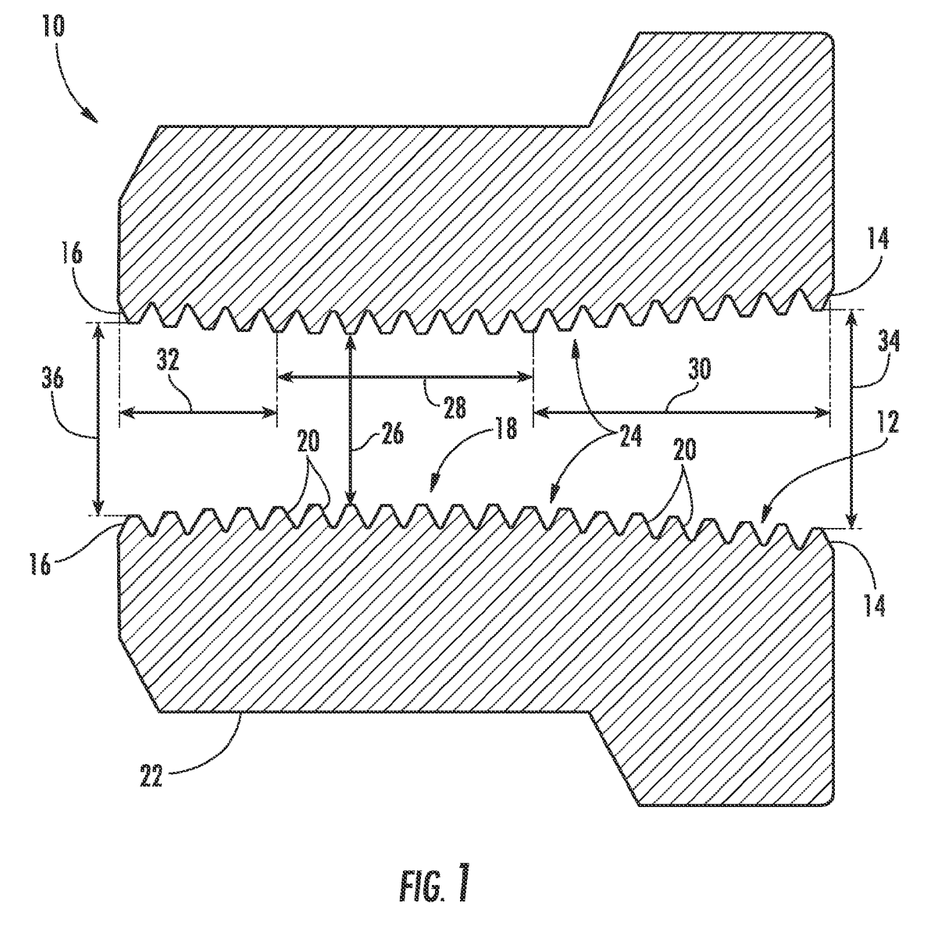
FIG. 1 is a cross section of a fastener according to a first embodiment of the present invention.

FIG. 1 provides a cross section of a fastener 10 according to a first embodiment of the present invention. The fastener 10 generally includes a threaded surface 12, first and second ends or segments 14, 16, and an intermediate position or segment 18. The threaded surface 12 comprises threads 20 that spiral around a surface of the fastener 10. For example, the fastener 10 may be a stud, a screw, or a bolt having an exterior surface, with the threaded surface 12 along the exterior surface of the stud, screw, or bolt. Alternately, as shown in FIG. 1, the fastener 10 may be a nut 22 having an interior surface 24, with the threaded surface 12 along the interior surface 24 of the nut 22. The threaded surface 12 generally extends along an axial length of the fastener 10 and has an effective diameter 26 that changes axially outward from the intermediate segment 18. As used herein, the "effective diameter" is the distance between the crest or tip of the threads 20 on opposite sides of the threaded surface 12. For example, in the case of a stud, screw, or bolt, the effective diameter 26 is the distance between thread crests or tips on opposite sides of the stud, screw, or bolt. In the case of the nut 22 shown in FIG. 1, the effective diameter 26 is similarly measured as the distance between thread crests or tips on opposite sides of the nut 22.

The first and second ends 14, 16 are generally opposed to one another at opposite ends of the threaded surface 12. If desired, the fastener 10 may also include an unthreaded shank that extends beyond the first and/or second ends 14, 16. The intermediate segment 18 may be near the middle of the threaded surface 12 or at any point between the first and second ends 14, 16. As shown in FIG. 1, the intermediate segment 18 may have a width 28 with a substantially constant effective diameter 26 across the width 28 of the intermediate segment 18. In addition, the distance between the intermediate segment 18 and the first and second ends 14, 16 may be the same or different, depending on the particular embodiment. For example, as shown in FIG. 1, a first distance 30 between the intermediate segment 18 and the first end 14 is greater than a second distance 32 between the intermediate segment 18 and the second end 16.

As shown in FIG. 1, the effective diameter 26 of the threaded surface 12 may change substantially linearly from the intermediate segment 18 to the first end 14. Similarly, the effective diameter 26 of the threaded surface 12 may change substantially linearly from the intermediate segment 18 to the second end 16. For example, for the nut 22 shown in FIG. 1, the effective diameter 26 of the threaded surface 12 increases from the intermediate segment 18 to the first end 14 and from the intermediate segment 18 to the second end 16. The effective diameter 26 of the threaded surface 12 at the first end 14 (labeled 34) is different than the effective diameter 26 of the threaded surface 12 at the second end 16 (labeled 36). The difference in the effective diameters 34, 36 at the first and second ends 14, 16 may be achieved in any of several alternate methods. For example, as shown in FIG. 1, the slope of the tapered threaded surface 12 from the intermediate segment 18 to the first and second ends 14, 16 may be substantially the same, and the difference between the first distance 30 and the second distance 32 produces a corresponding difference in the effective diameters 34, 36 at the first and second ends 14, 16.

Figure 2:
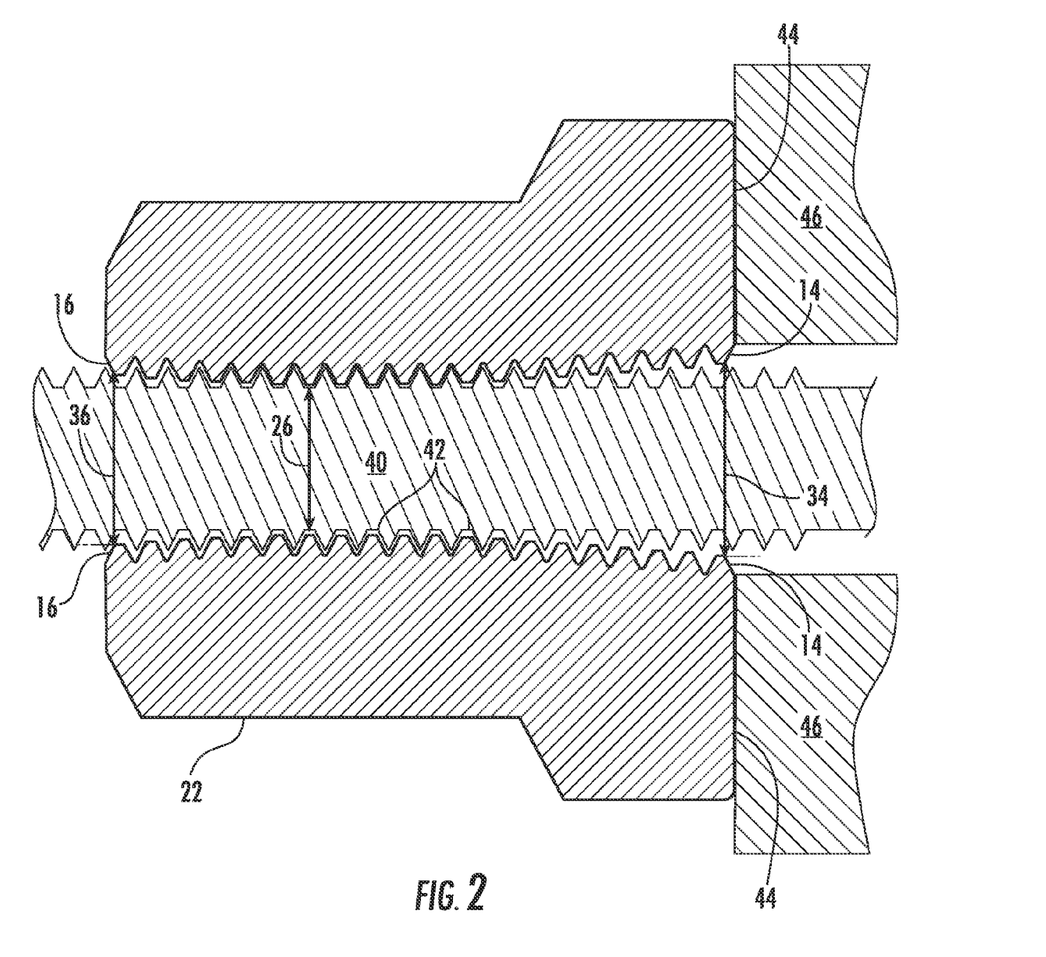
FIG. 2 is a cross section of the fastener shown in FIG. 1 installed in a workpiece.

FIG. 2 shows a cross section of the fastener 10 shown in FIG. 1 installed in a work piece. As shown, the fastener 10 is a nut 22 threaded around a stud 40 having a constant diameter threaded surface 42. If desired, the stud 40 may be heated to expand or stretch the stud 40, and the nut 22 may then be tightened around the stud 40 until a surface 44 of the nut 22 engages a reaction flange 46 or other surface. As the stud 40 cools, the stud 40 contracts, causing the threaded surface 42 of the stud 40 to draw the nut 22 against the reaction flange 46. The asymmetrical threaded surface 12 of the nut 22 (slightly exaggerated for illustrative purposes) transfers the force created by the contracting stud 40 more evenly among the threads 20 of the nut 22 to draw the fastener 10 tightly against the reaction flange 46.

Figure 3:
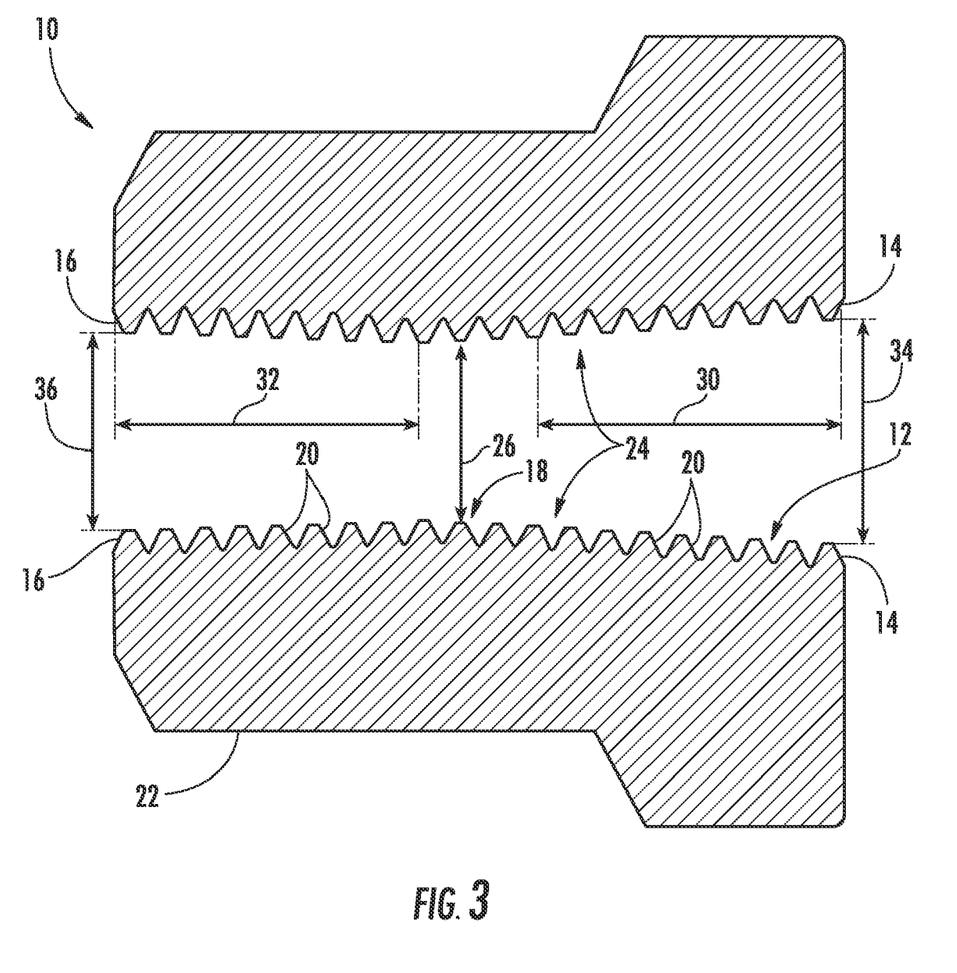
FIG. 3 is a cross section of a fastener according to a second embodiment of the present invention.

FIG. 3 provides a cross section of the an alternate embodiment of the fastener 10. The fastener 10 again includes the threaded surface 12, first and second ends or segments 14, 16, and intermediate position or segment 18 as previously described with respect to the embodiment shown in FIG. 1. In this particular embodiment, the first distance 30 between the intermediate segment 18 and the first end 14 is the same as the second distance 32 between the intermediate segment 18 and the second end 16. However, the slope of the tapered threaded surface 12 from the intermediate segment 18 to the first end 14 is greater than the slope of the tapered threaded surface 12 from the intermediate segment 18 to the second end 16. As a result, the threaded surface 12 is again asymmetric, with the effective diameter 34 at the first end 14 greater than the effective diameter 36 at the second end 16.

Figure 4:
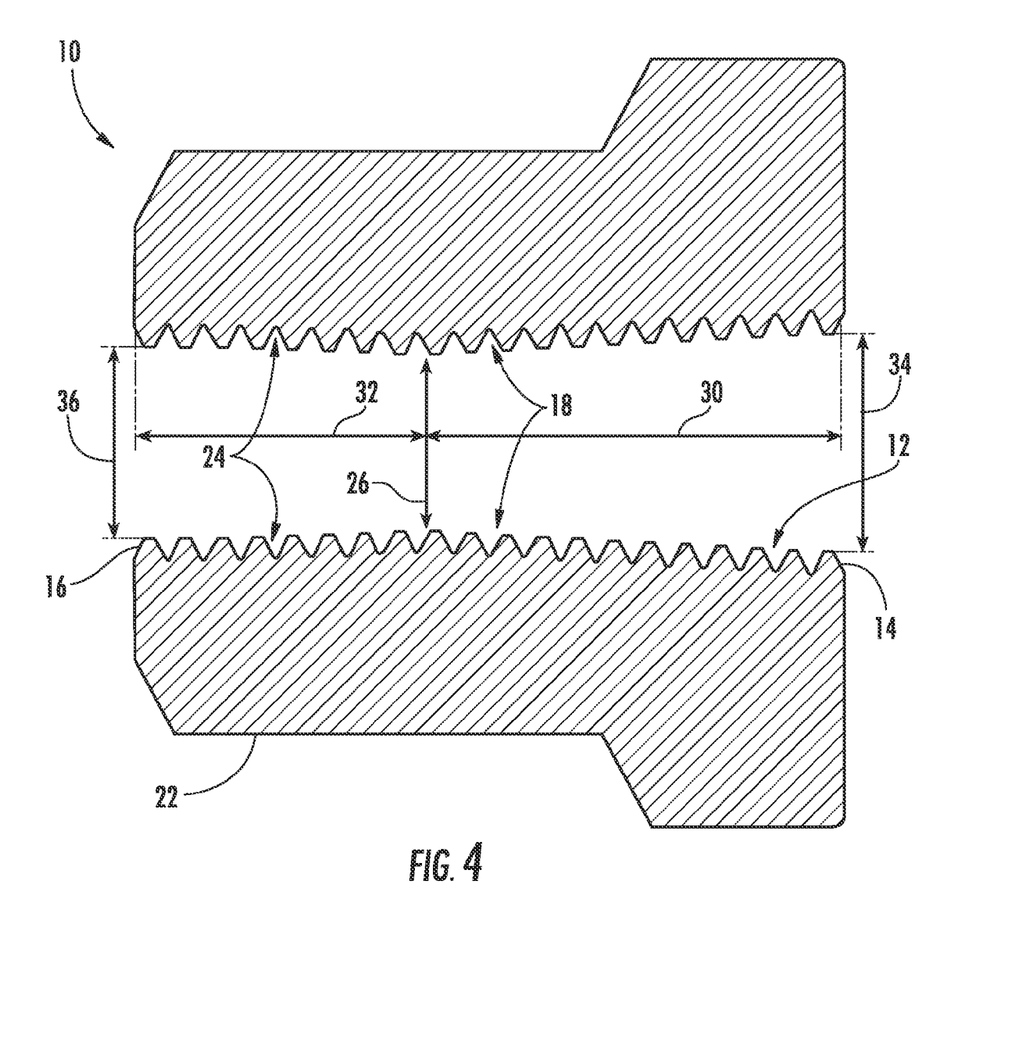
FIG. 4 is a cross section of a fastener according to a third embodiment of the present invention.

FIG. 4 provides a cross section of the fastener 10 according to a third embodiment of the present invention. The fastener 10 again includes the threaded surface 12, first and second ends or segments 14, 16, and intermediate position or segment 18 as previously described with respect to the embodiment shown in FIG. 1. In this particular embodiment, the intermediate position or segment 18 is simply a joint or common surface between the first and second ends or segments 14, 16. As with the embodiment previously described with respect to FIG. 1, the effective diameter 26 of the threaded surface 12 changes from the intermediate point 18 to the first and second ends 14, 16. The slope of the tapered threaded surface 12 from the intermediate segment 18 to the first and second ends 14, 16 is substantially the same, and the difference between the first distance 30 and the second distance 32 produces a corresponding difference in the effective diameters 34, 36 at the first and second ends 14, 16.

Figure 5:
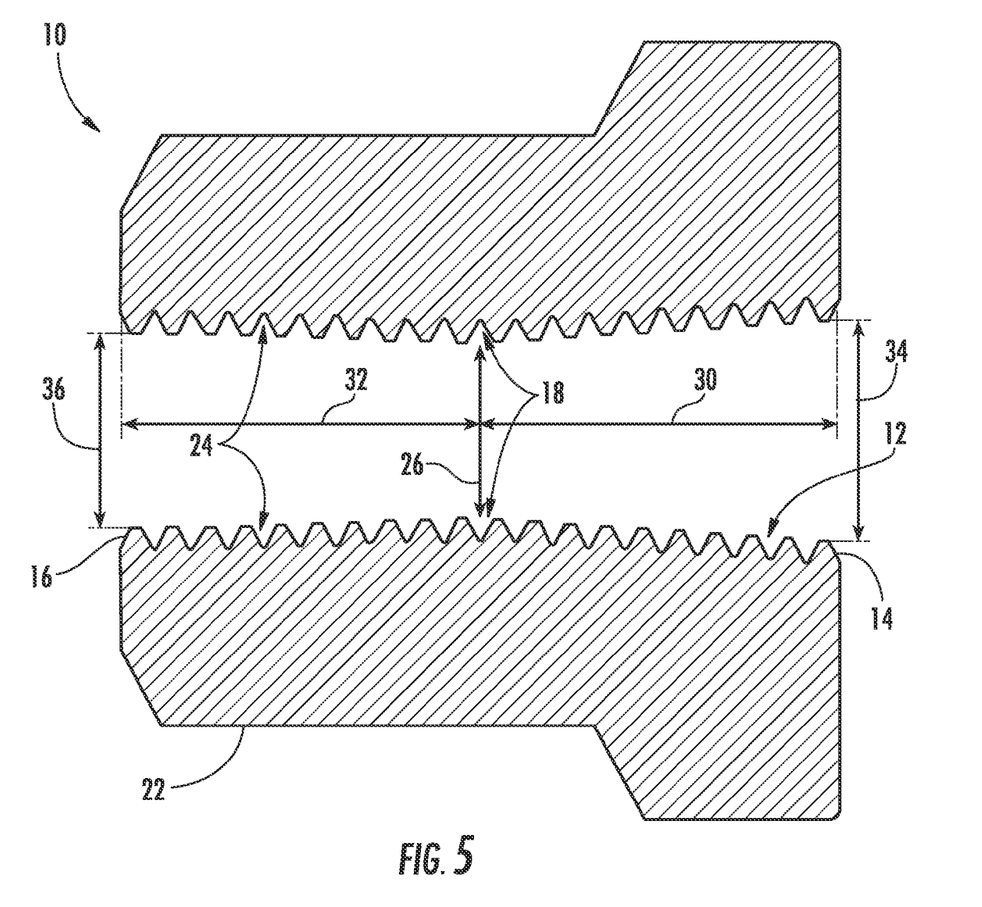
FIG. 5 is a cross section of a fastener according to a fourth embodiment of the present invention.

FIG. 5 provides a cross section of the fastener 10 according to a fourth embodiment of the present invention. The fastener 10 again includes the threaded surface 12, first and second ends or segments 14, 16, and intermediate position or segment 18 as previously described with respect to the embodiment shown in FIG. 1. As with the embodiment shown in FIG. 4, the intermediate position or segment 18 is simply a joint or common surface between the first and second ends or segments 14, 16. In this particular embodiment, the first distance 30 between the intermediate segment 18 and the first end 14 is the same as the second distance 32 between the intermediate segment 18 and the second end 16. However, the slope of the tapered threaded surface 12 from the intermediate segment 18 to the first end 14 is greater than the slope of the tapered threaded surface 12 from the intermediate segment 18 to the second end 16. As a result, the threaded surface 12 is again asymmetric, with the effective diameter 34 at the first end 14 greater than the effective diameter 36 at the second end 16.

Figure 6:
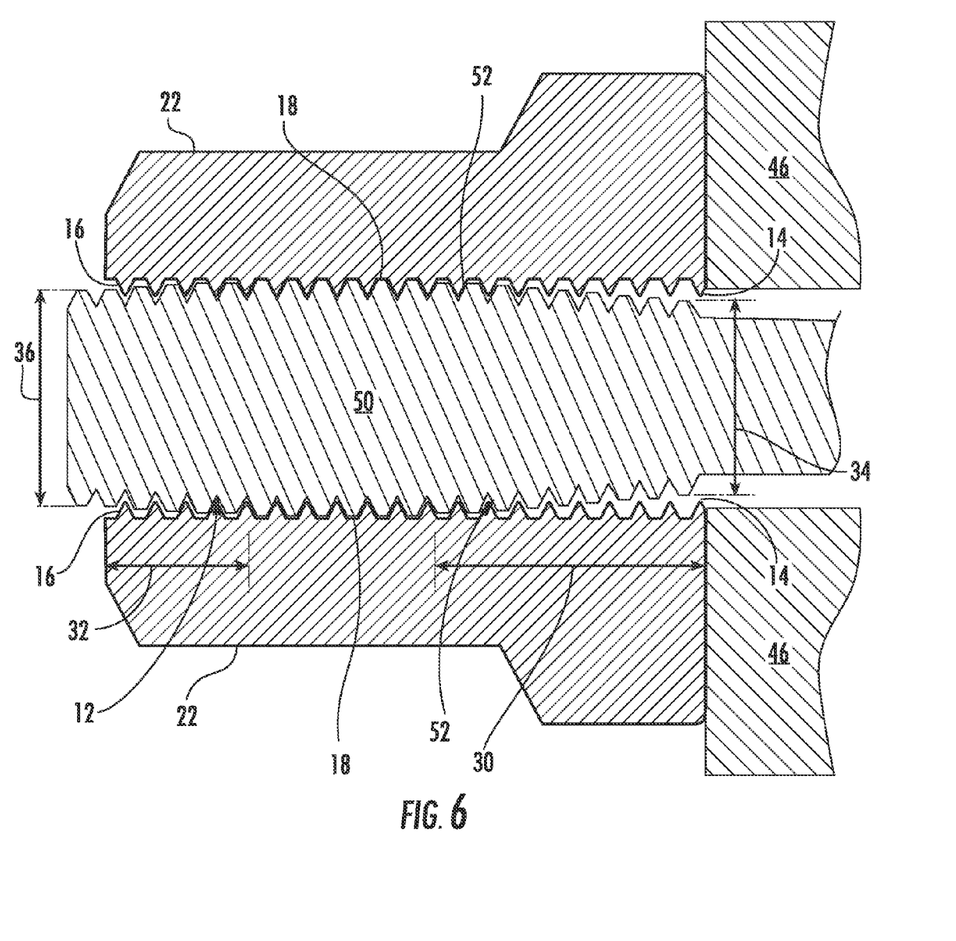
FIG. 6 is a cross section of a fastener according to a fifth embodiment of the present invention installed in a workpiece.

FIG. 6 provides a cross section of the fastener 10 according to a fifth embodiment of the present invention installed in a work piece. In this particular embodiment, the fastener 10 is a stud 50 to illustrate that the descriptions and teachings of the previous embodiments apply equally well to a stud, screw, or bolt. Specifically, the stud 50 again includes the threaded surface 12, first and second ends or segments 14, 16, and intermediate position or segment 18 as previously described with respect to the embodiments shown in FIGS. 1-5. Notably, with the threaded surface 12 along an exterior surface 52 of the stud 50, the effective diameter 26 of the threaded surface 12 decreases from the intermediate position or segment 18 to the first end or segment 14 and from the intermediate position or segment 18 to the second end or segment 16. As in the previously described embodiments, the intermediate position or segment 18 may be a joint between the first and second ends 14, 16 or may have a width 28 having a substantially constant effective diameter 26. Similarly, the slope of the tapered threaded surface 12 and the distances 30, 32 between the intermediate position or segment 18 and the first and second ends 14, 16 may be adjusted as desired to achieve the asymmetric threaded surface 12 (slightly exaggerated for illustrative purposes) with the effective diameter 34 at the first end 14 different than the effective diameter 36 at the second end 16.

Figure 7:
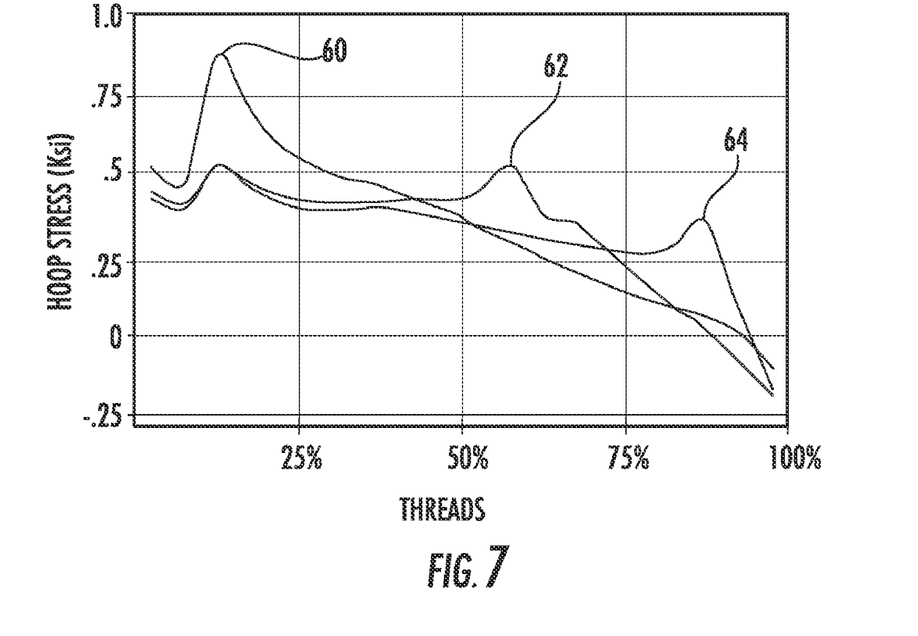
FIG. 7 is an exemplary graph of the hoop stress of the fasteners shown in FIGS. 1 and 4 compared to a fastener having a constant effective diameter.
Figure 8:
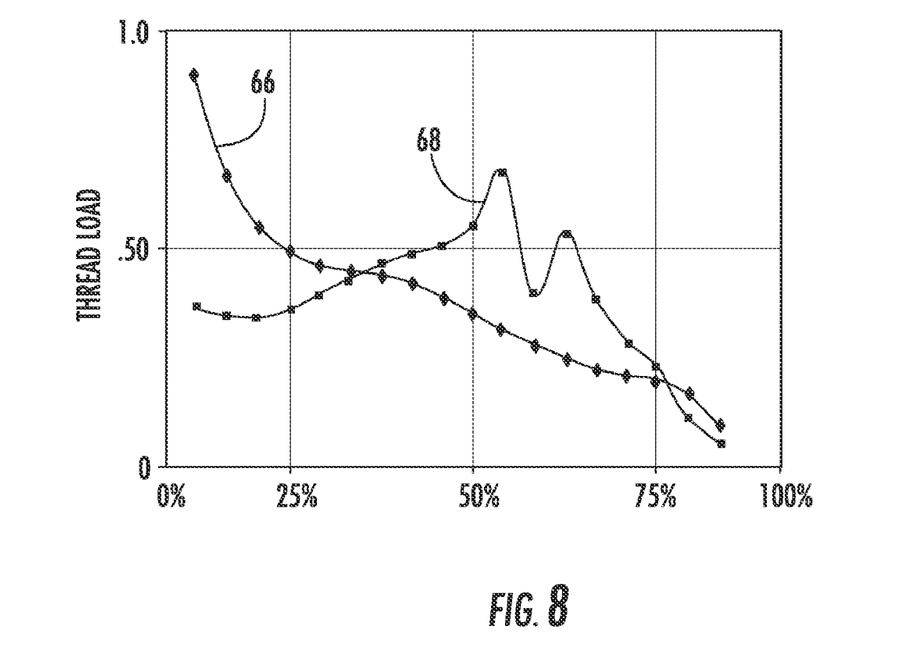
FIG. 8 is an exemplary graph of the thread load of the fastener shown in FIG. 1 compared to a fastener having a constant effective diameter.

FIG. 7 provides an exemplary graph of the hoop stress of the threaded fasteners 10 shown in FIGS. 1 and 4 compared to a threaded fastener having a constant effective diameter. Specifically, the hoop stress curve for the threaded fastener having a constant effective diameter (labeled 60) indicates that the first 25% of the threads bear a disproportionately high hoop stress compared to the remaining 75% of the threads. In contrast, the hoop stress curve for the embodiments shown in FIG. 1 (labeled 62) and FIG. 4 (labeled 64) indicates that the hoop stress is relatively evenly distributed between the first 60% of the threads. Similarly, FIG. 8 provides an exemplary graph of the thread load of the threaded fastener 10 shown in FIG. 1 compared to a threaded fastener having a constant effective diameter. Consistent with the information provided in FIG. 7, the curve for the threaded fastener having a constant effective diameter (labeled 66) indicates that the thread load decreases by more than 50% after the first 25% of the threads. In contrast, the asymmetric threaded surface 12 shown in more evenly distributes the thread load across 50-75% of the threads. FIGS. 7 and 8 both demonstrate that the various embodiments of the present invention will enable the fastener 10 to sustain higher loads before failure compared to conventional fasteners having a relatively constant effective diameter. Alternately, the size and/or weight of the fastener 10 may be reduced while still meeting the same designed load requirements, resulting in manufacturing, maintenance, and repair savings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A fastener comprising:
    a. a threaded surface, wherein the threaded surface has an effective diameter;
    b. a first end of the threaded surface;
    c. a second end of the threaded surface opposite the first end;
    d. an intermediate position of the threaded surface between the first end and the second end;
    e. wherein the effective diameter of the threaded surface changes continuously from the intermediate position to the first end;
    f. wherein the effective diameter of the threaded surface changes continuously from the intermediate position to the second end; and
    g. wherein the effective diameter of the threaded surface at the first end is different than the effective diameter of the threaded surface at the second end.

2. The fastener as in claim 1, wherein the fastener is a nut having an interior surface with the threaded surface along the interior surface of the nut.

3. The fastener as in claim 1, wherein the fastener is at least one of a stud, a screw, or a bolt having an exterior surface with the threaded surface along the exterior surface of the stud, screw, or bolt.

4. The fastener as in claim 1, wherein the effective diameter of the threaded surface increases from the intermediate position to the first end and from the intermediate position to the second end.

5. The fastener as in claim 1, wherein the effective diameter of the threaded surface decreases from the intermediate position to the first end and from the intermediate position to the second end.

6. The fastener as in claim 1, wherein the intermediate position has a width, and the effective diameter of the threaded surface across the width of the intermediate position is substantially constant.

7. The fastener as in claim 1, further comprising a first distance between the intermediate position and the first end and a second distance between the intermediate position and the second end, and wherein the first distance is greater than the second distance.

8. A fastener comprising:
    a. a threaded surface, wherein the threaded surface has an effective diameter;
    b. a first segment of the threaded surface, wherein the effective diameter of the threaded surface changes along the first segment;
    c. a second segment of the threaded surface opposed to the first segment, wherein the effective diameter of the threaded surface changes along the second segment; and
    d. wherein the change in the effective diameter of the threaded surface along the first segment is greater than the change in the effective diameter of the threaded surface along the second segment.

9. The fastener as in claim 8, wherein the fastener is a nut having an interior surface with the threaded surface along the interior surface of the nut.

10. The fastener as in claim 8, wherein the fastener is at least one of a stud, a screw, or a bolt having an exterior surface with the threaded surface along the exterior surface of the stud, screw, or bolt.

11. The fastener as in claim 8, further comprising an intermediate segment between the first and second segments, wherein the effective diameter of the threaded surface increases from the intermediate segment along the first segment and from the intermediate position along the second segment.

12. The fastener as in claim 8, further comprising an intermediate segment between the first and second segments, wherein the effective diameter of the threaded surface decreases from the intermediate position along the first segment and from the intermediate position along the second segment.

13. The fastener as in claim 8, further comprising an intermediate segment between the first and second segments, wherein the intermediate segment has a width, and the effective diameter of the threaded surface across the width of the intermediate segment is substantially constant.

14. The fastener as in claim 8, further comprising an intermediate segment between the first and second segments, a first distance between the intermediate segment and a distal end of the first segment, a second distance between the intermediate segment and a distal end of the second segment, and wherein the first distance is greater than the second distance.

15. A fastener comprising:
   a. a threaded surface, wherein the threaded surface has a first end, a second end opposite the first end, and an effective diameter between the first end and the second end;
   b. an intermediate position on the threaded surface between the first and second ends, wherein the effective diameter of the threaded surface changes continuously from the intermediate position to the first end and from the intermediate position to the second end; and
   c. wherein the effective diameter of the threaded surface at the first end is greater than the effective diameter of the threaded surface at the second end.

16. The fastener as in claim 15, wherein the effective diameter of the threaded surface increases from the intermediate position to the first end and from the intermediate position to the second end.

17. The fastener as in claim 15, wherein the effective diameter of the threaded surface decreases from the intermediate position to the first end and from the intermediate position to the second end.

18. The fastener as in claim 15, wherein the intermediate position has a width, and the effective diameter of the threaded surface across the width of the intermediate position is substantially constant.

19. The fastener as in claim 15, further comprising a first distance between the intermediate position and the first end and a second distance between the intermediate position and the second end, and wherein the first distance is greater than the second distance.

20. The fastener as in claim 15, wherein the fastener is at least one of a stud, a screw, or a bolt having an exterior surface with the threaded surface along the exterior surface of the stud, screw, or bolt.

* * * * *